United States Patent
Everhart

(10) Patent No.: US 11,005,894 B2
(45) Date of Patent: May 11, 2021

(54) METHODS FOR DEMULTIPLEXING SERVICES OVER PORTS AND DEVICES THEREOF

(71) Applicant: NetApp, Inc., Sunnyvale, CA (US)

(72) Inventor: Craig Everhart, Pittsburgh, PA (US)

(73) Assignee: NETAPP, INC., Sunnyvale, CA (US)

( * ) Notice: Subject to any disclaimer, the term of this patent is extended or adjusted under 35 U.S.C. 154(b) by 182 days.

(21) Appl. No.: 16/381,887

(22) Filed: Apr. 11, 2019

(65) Prior Publication Data

US 2020/0329074 A1    Oct. 15, 2020

(51) Int. Cl.
*H04L 29/06*    (2006.01)
*H04L 12/18*    (2006.01)

(52) U.S. Cl.
CPC ........ *H04L 63/205* (2013.01); *H04L 12/1895* (2013.01); *H04L 63/166* (2013.01); *H04L 69/163* (2013.01)

(58) Field of Classification Search
CPC . H04L 63/205; H04L 69/163; H04L 12/1895; H04L 63/166; H04L 63/0272; H04L 63/0227
See application file for complete search history.

(56) References Cited

U.S. PATENT DOCUMENTS

| | | | |
|---|---|---|---|
| 9,591,582 B1* | 3/2017 | Rabii | H04L 43/028 |
| 10,152,716 B2* | 12/2018 | Itwaru | H04L 69/329 |
| 2003/0035439 A1* | 2/2003 | Watanabe | H04L 12/4612 370/466 |
| 2006/0133370 A1* | 6/2006 | Eldar | G06F 13/385 370/389 |
| 2014/0101775 A1* | 4/2014 | Cheung | H04L 63/0428 726/27 |
| 2017/0324665 A1* | 11/2017 | Johnsen | H04L 49/70 |
| 2018/0205746 A1* | 7/2018 | Boutnaru | H04L 63/0236 |
| 2018/0337887 A1* | 11/2018 | Aluvala | H04L 63/0281 |
| 2019/0149480 A1* | 5/2019 | Singhvi | H04L 47/78 709/226 |
| 2019/0260712 A1* | 8/2019 | Waterman | H04L 9/08 |
| 2019/0327345 A1* | 10/2019 | Wu | H04L 45/66 |
| 2019/0379660 A1* | 12/2019 | Thirumavalavan | H04L 51/046 |
| 2020/0076732 A1* | 3/2020 | Yang | H04L 61/2517 |

OTHER PUBLICATIONS

"Opportunistic TLS", Feb. 22, 2019, 5 pages, Retrieved from the Internet:<https://en.wikipedia.org/wiki/Opportunistic_TLS., Wikipedia.

\* cited by examiner

*Primary Examiner* — Michael R Vaughan
(74) *Attorney, Agent, or Firm* — Troutman Pepper Hamilton Sanders LLP

(57) ABSTRACT

Methods, non-transitory machine readable media, and computing devices that facilitate demultiplexing services over ports are disclosed. With this technology, a request is received via a connection over one or more communication networks. The request includes payload data and a port number. At least a portion of the payload data is analyzed to determine one of a set of protocols associated with the port number. A service is then bound to the connection based on the determined one of the set of protocols. The service is configured to interpret the request. This technology advantageously allows the use of multiple protocols for a port number in a manner that is compatible with existing protocols and does not require any client-side code or coordination.

20 Claims, 4 Drawing Sheets

```
//   TLS case:                    byte      RPC case:
// 22 (handshake)                  0        record framing (1 bit=end)
// 3 (vers.high)                   1        then 31 bits of size
// one of {3|2|1|0} (vers.low)2             of the following
// len.high                        3        record
// len.low                         4        rm_xid (4) arbitrary
// 1 (client_hello)                5        rm_xid   bits
// len.high                        6        rm_xid   chosen by
// len.middle                      7        rm_xid   client
// len.low                         8        rm_direction: msg_type (4): 0 or 1
// ClientHello: vsn.h              9        0   (CALL is 0)
// vsn.l                          10        0   (REPLY is 1)
// Random: gmtTime (0)            11        0   all in 4 net-byte-order bytes
```

FIG. 4

METHODS FOR DEMULTIPLEXING SERVICES OVER PORTS AND DEVICES THEREOF

FIELD

This technology generally relates to demultiplexing services over ports and, more particularly, to methods and devices for utilizing a same port number for the exchange of network communications associated with different protocols.

BACKGROUND

Active initiators of network traffic, including client devices, utilize port numbers to indicate a particular service to be used by listeners, including server devices, to interpret or process the network traffic. Many well-known port numbers are available and reserved for public use, such as port 80, which is used for HyperText Transfer Protocol (HTTP) for transmitting web content, and port 25, which is used for Simple Mail Transport Protocol (SMTP) for e-mail routing between mail servers. In these examples, the application layer protocol (i.e., HTTP or SMTP) utilizes an underlying transport layer protocol of the Internet Protocol (IP) suite, such as Transmission Control Protocol (TCP), for example.

Accordingly, client devices can include 16-bit unsigned port numbers in headers of packets associated with a TCP data stream to identify receiving application end-points or services on server devices. While other types of port numbers are available, including registered and dynamic or private, well-known port numbers are assigned by the Internet Assigned Numbers Authority (IANA). It is generally difficult to obtain and reserve a port number from the IANA or other similar agencies, and the number of available port numbers is scarce.

In particular, the process for obtaining a reserved port number for a particular service is cumbersome, expensive, and time-consuming. Additionally, firewall devices in communication networks allow only a particular number of specified port numbers to be used for incoming connections. Accordingly, existing firewall devices would have to be reconfigured to allow communications to services associated with newly-allocated port numbers in order to prevent associated network traffic from being blocked.

BRIEF DESCRIPTION OF THE DRAWINGS

FIG. 4 is a table of exemplary protocol formats for exemplary secure and non-secure protocols.

DETAILED DESCRIPTION

Figure 1:
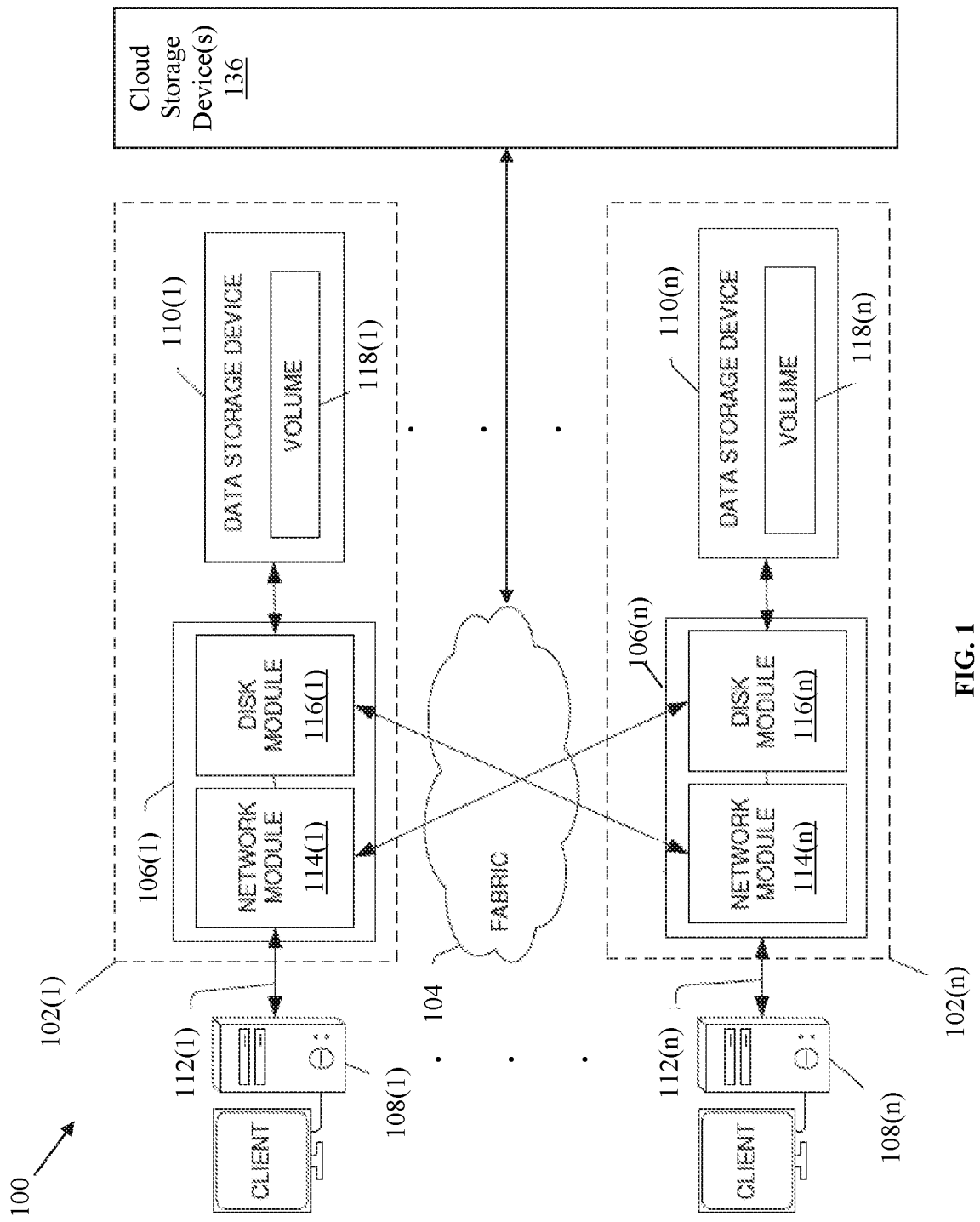
FIG. 1 is a block diagram of a network environment with exemplary node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster or data fabric 104 that includes one or more communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that facilitate transmission of multiple protocols using a same port number to thereby facilitate utilization of an increased number of services with reduced port number allocation.

In this example, node computing devices 106(1)-106(n) can be primary or local storage controllers or secondary or remote storage controllers that provide client devices 108(1)-108(n) with access to data stored within data storage devices 110(1)-110(n) and cloud storage device(s) 136. The data storage apparatuses 102(1)-102(n) and/or node computing devices 106(1)-106(n) of the examples described and illustrated herein are not limited to any particular geographic areas and can be clustered locally and/or remotely, or not clustered in other examples. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within cloud storage device(s) 136), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
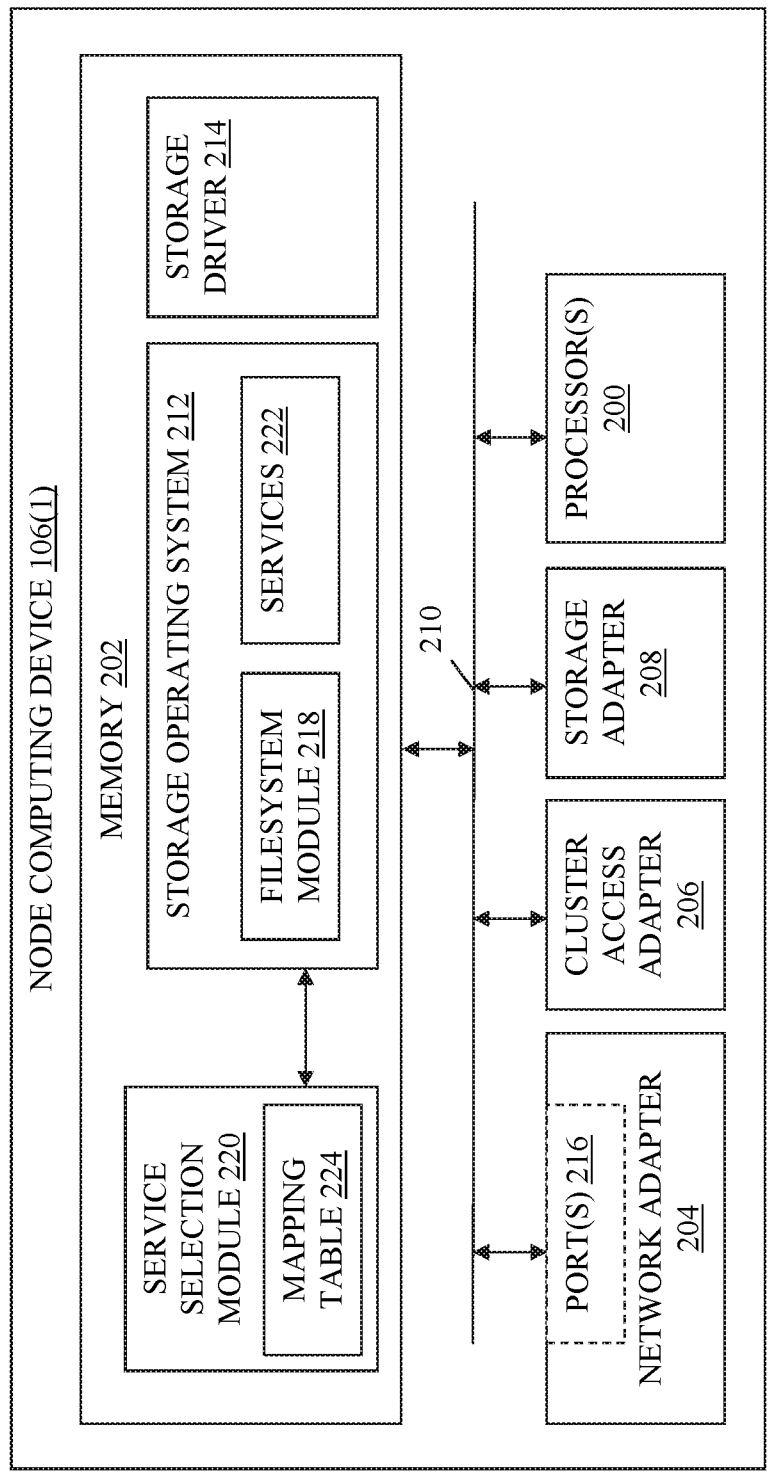
FIG. 2 is a block diagram of one of the exemplary node computing device of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) (not shown) with cloud storage device(s) 136 to process storage operations associated with data stored thereon.

In this particular example, the network adapter has associated port(s) 216 that are virtual or software constructs each associated with a particular port number and one of the services 222, which are also commonly referred to as interpreters. The services 222 can be bound or attached to incoming connections and are configured to process or interpret the network traffic associated with those connections. The services 222 can be particular processes, applications, or modules hosted by the storage operating system 212 or otherwise in the memory 202. TCP uses the port(s) 216, along with a tuple of other information in network packets such as source and destination IP addresses, to multiplex simultaneous communication sessions or connections for the same one of the services 222.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) or cloud storage device(s) 136 (e.g., or additional clustered devices) in accordance with the client device requests.

The file system module 218 of the storage operating system 212 can establish and manage one or more filesystems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes a service selection module 220 that is configured to observe, but not consume, portions of payload data on initial requests for a connection to make a determination regarding which of the services 222 to bind to the connections for interpreting the associated network traffic. In this example, the service selection module 220 includes a mapping table 224 that can include a mapping of port numbers associated with the port(s) 216 to an associated set of protocols for network traffic received via incoming connections associated with the port(s) 216 and available services for processing the network traffic associated with each of the protocols in the set of protocols.

For example, the mapping table 224 can store an indication of port number "11104" mapped to a set of protocols including "TCP-over-SunRPC" and "TCP-over-TLS-over-SunRPC", which are mapped to "Non-Secure SunRPC" and "Secure SunRPC" ones of the services 222, respectively, although many other types of port numbers, protocols, and services can be used in other examples. Additionally, the service selection module 220 can utilize other data structures or methods to manage associations of port numbers, protocols, and services 222 and facilitate selection of one of the services 222. Accordingly, based on a review of portion(s) of received TCP packets, the service selection module 220 determines which of the set of protocols are associated with the network traffic and selects one of the services 222 to bind or attach to the associated incoming connection, as described and illustrated in more detail later with reference to FIGS. 3-4.

The examples of the technology described and illustrated herein may be embodied as one or more non-transitory computer readable media having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-4, for example.

Figure 3:
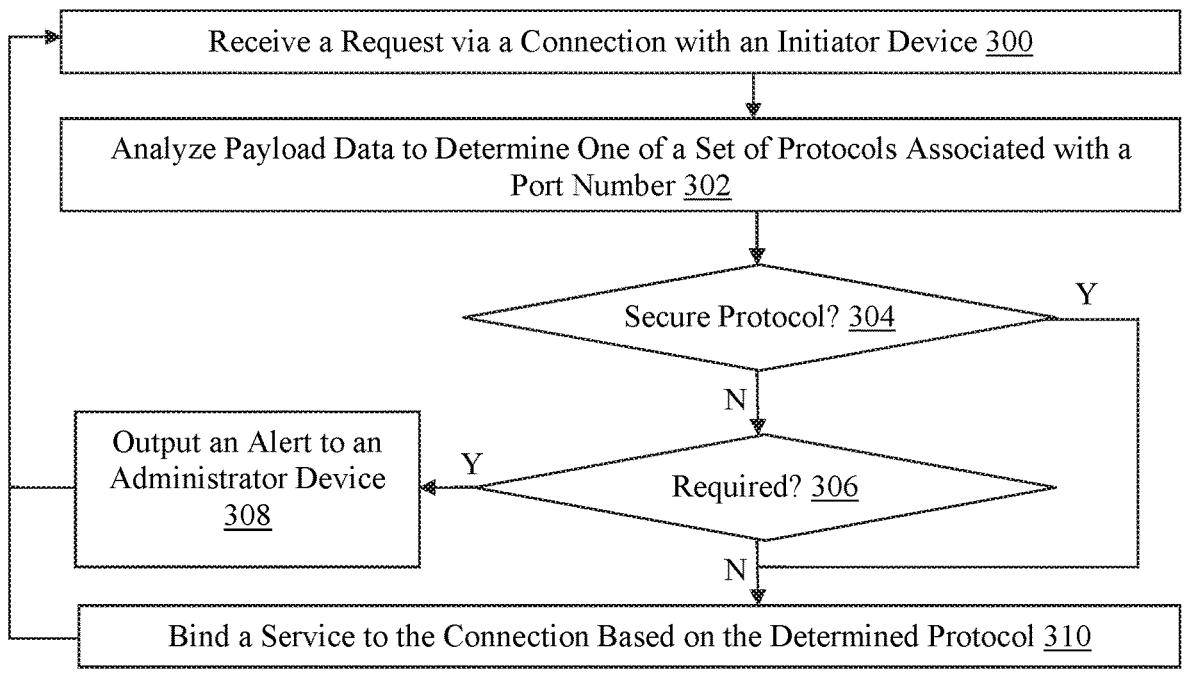
FIG. 3 is a flowchart of an exemplary method for demultiplexing services over ports.

Referring more specifically to FIG. 3, a flowchart illustrating an exemplary method for demultiplexing services over ports is illustrated. In step 300 in this example, the node computing device 106(1) receives a request via connection with an initiator device. The initiator device can be one of the client devices 108(1)-108(n) or another node computing device 106(n), for example. In one particular example, the request can be from the node computing device 106(n) to establish a connection for moving data across the cluster fabric 104 for data protection purposes as part of a peer relationship, although other types of requests from other originating devices can also be used in other examples.

In step 302, the node computing device 106(1) analyzes payload data in the request to determine one of a set of protocols associated with a port number in a header of one or more packets associated with the request. The node computing device 106(1) can use available functionality provided by the storage operating system 212 to observe, but not consume, an initial portion of the payload data of the TCP packet(s) associated with the request. For protocols that have a well-defined convention or format, a first byte or early portion of the payload data can discriminate between various of the set of protocols associated with the port number (e.g., in the mapping table 224).

In one particular example, the node computing devices 106(1) and 106(n) communicate over the cluster fabric 104 using a proprietary protocol referred to herein as "SpinNP", which can be packed and used securely (e.g., over connection transport (Ct) over TLS over TCP) or non-securely (e.g., as plaintext over connection transport over TCP). Accordingly, in this example, the set of protocols include "SpinNP-over-Ct-over-TLS-over-TCP" and "SpinNP-over-Ct-over-TCP". When SpinNP is carried with Ct framing, Ct packets in compliance with the protocol start with a signature byte value of "0xa3". The signature byte value is followed by three bytes indicating the length of the packet, two bytes of a version number, one byte of opcode, one byte of flags, and then the SpinNP packet.

However, when SpinNP is carried with Ct framing over TLS, the first byte is a "ContentType" indication of content type "handshake" or decimal "22", which is followed by two bytes of the TLS version and two bytes indicating a length of the packet. While the two protocols have different requirements regarding each byte, and several of the bytes could be any value, the first byte is a reliable discriminator for the two protocols. In other words, if the first byte is "0xa3", the protocol associated with the request is "SpinNP-over-Ct-over-TCP", but if the first byte is decimal "22", the protocol is "SpinNP-over-Ct-over-TLS-over-TCP". Accordingly, the service selection module 220 is able to determine whether the next protocol above TCP (i.e., the application layer protocol) is TLS or Ct in this example based on the first byte received with a connection request.

Referring more specifically to FIG. 4, a table of exemplary protocol formats for exemplary secure and non-secure protocols is illustrated. In this particular example, the secure protocol is "SunRPC-over-TLS-over-TCP" and the non-secure protocol is "SunPRC-over-TCP". In this example, the first four bytes of the received request (i.e., bytes 0-3) are not well defined in the Remote Procedure Call (RPC) case and relate to bits of size of the following record. Accordingly, byte 0 could legitimately be a decimal "22", which is equivalent to the required value of byte 0 in the SSL case. Therefore, the first byte is not a reliable discriminator for the "SunRPC-over-TLS-over-TCP" and "SunPRC-over-TCP" protocols.

In fact, the first eight bytes in the RPC case are arbitrary and not reliable discriminators, but the ninth byte (i.e., byte 8) is a reliable discriminator for the "SunRPC-over-TLS-over-TCP" and "SunPRC-over-TCP" protocols. The ninth byte of payload data in compliance with SunRPC is necessarily a "0" whereas the ninth byte of payload data in compliance with TLS cannot have a value of "0". Accordingly, the service selection module 220 in this example is configured to analyze or observe the first 9 bytes of received payload data for a request identifying a particular port number associated with the set of "SunRPC-over-TLS-over- TCP" and "SunPRC-over-TCP" protocols in order to discriminate between, or determine one of, the protocols. Other types of protocols and other methods for distinguishing between protocols in a set associated with a particular port number can also be used in other examples.

Referring back to step 302 or FIG. 3, the node computing device 106(1) in this example can retrieve the port number from one or more of the packets associated with the request received in step 300 (e.g., the first packet) and identify the set of protocols associated with the port number based on a correlation of the port number with contents of the mapping table 224, for example. Based on the identified set of protocols, the service selection module 220 can be configured to determine what portion of the payload data (e.g., a first byte, a ninth byte, or an initial number or set of bytes) must be observed in order to reliably discriminate between the protocols in the identified set in order to determine a particular one of the protocols in the set that is associated with the request.

In step 304, the node computing device 106(1) optionally determines whether the one of the set of protocols determined in step 302 is secure (e.g., includes TLS). The service selection module 220 can store a list of secure protocols or otherwise be configured to identify whether a protocol is secure or non-secure. If the node computing device 106(1) determines that the determined protocol is not secure, then the No branch is taken to step 306 in this example.

In step 306, the node computing device 106(1) optionally determines whether a secure protocol is required for the particular connection. In some examples, particular initiator devices associated with source IP addresses in one or more of the packets associated with the request received in step 300 may be required to communicate securely with the node computing device 106(1). In one particular example, the node computing devices 106(1) and 106(n) have a peer relationship that requires secure communicates via a particular port number.

The node computing devices 106(1) and 106(n) can be preconfigured to have the peer relationship prior to exchanging any network traffic. Other types of relationships and arrangements requiring secure communications can also be used. If the node computing device 106(1) determines in step 306 that a secure protocol is required for the connection, then the Yes branch is taken to step 308.

In step 308, the node computing device 106(1) can output an alert to an administrator device (not shown). The alert can include information regarding the requested connection to facilitate an analysis of the non-secure connection attempt. Other responses to a non-secure connection attempt for a connection that is required to be secure can also be used in other examples. However, if the node computing device 106(1) determines in step 304 that the determined one of the set of protocols is secure and the Yes branch is taken, or in step 306 that a secure protocol is not required and the No branch is taken, then the node computing device 106(1) proceeds to step 310.

In step 310, the node computing device binds one of the services 222 to the connection based on the one of the set of protocols determined in step 302. The one of the services 222 bound to the connection can be an application or operating system process that is configured to interpret the request received in step 300 based on the associated protocol. For example, if the protocol includes TLS, the one of the services 222 may be configured to interpret the request as a TLS handshake message or client hello. The service selection module 220 can identify the one of the services 222 based on a correlation in the mapping table 224 of the one of the services 222 with the one of the set of protocols determined in step 302, for example, although other methods for identifying the one of the services 222 can also be used in other examples.

Subsequent to outputting the alert in step 308 or binding the service to the connection in step 310, the node computing device 106(1) returns to step 300 and receives another request via another connection with another initiator device in this example. In other examples, one or more of steps 300-310 can be performed in a different order and/or in parallel for any number of requests received from any number of initiator devices.

With this technology, a single port number can advantageously be used for connections that are associated with two or more protocols. In some examples, the protocols can be secure and non-secure versions of the same protocol. Accordingly, with this technology, fewer port numbers, which are scarce and difficult to obtain, can be utilized to service connections associated with multiple protocols. For port number that are previously reserved and allowed by firewall devices, the firewall devices do not have to be reconfigured in order to allowed incoming connections associated with an increased number of protocols. Moreover, this technology does not require any particular client-side and server-side coordination, and is advantageously compatible with existing protocols.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   receiving, by a computing device, via a connection over one or more communication networks, at least one transmission control protocol (TCP) packet comprising payload data and a header comprising a port number;
   analyzing, by the computing device, a portion of the payload data to determine one of two or more network protocols associated with the port number in a stored mapping, wherein the portion of the payload data is separate from the header and differentiates between each of the network protocols;
   selecting, by the computing device, a service associated in the stored mapping with the determined one of the network protocols; and
   binding, by the computing device, the selected service to the connection, wherein the selected service is configured to interpret network traffic received via the connection according to the determined one of the network protocols.

2. The method of claim 1, wherein the portion of the payload data comprises one or more initial bytes of the payload data.

3. The method of claim 1, wherein the two or more network protocols comprise application layers protocols.

4. The method of claim 1, wherein the two or more network protocols comprise a secure protocol and a non-secure protocol.

5. The method of claim 4, wherein the secure protocol comprises a transport layer security (TLS) protocol and the non-secure protocol comprises a plaintext protocol.

6. The method of claim 4, further comprising outputting, by the computing device, an alert message when an initiator of the at least one TCP packet has an established relationship requiring communication based on the secure protocol and the determined one of the two or more network protocols comprises the non-secure protocol.

7. A non-transitory machine readable medium having stored thereon instructions for demultiplexing services over ports comprising machine executable code which when executed by at least one machine causes the machine to:
   receive, via a connection over one or more communication networks, at least one transmission control protocol (TCP) packet comprising payload data and a header comprising a port number;
   analyze a portion of the payload data to determine one of two or more network protocols associated with the port number in a stored mapping, wherein the portion of the payload data is separate from the header and differentiates between each of the network protocols;
   select a service associated in the stored mapping with the determined one of the network protocols; and
   bind the selected service to the connection, wherein the selected service is configured to interpret network traffic received via the connection according to the determined one of the network protocols.

8. The non-transitory machine readable medium of claim 7, wherein the portion of the payload data comprises one or more initial bytes of the payload data.

9. The non-transitory machine readable medium of claim 7, wherein the two or more network protocols comprise application layers protocols.

10. The non-transitory machine readable medium of claim 7, wherein the two or more network protocols comprise a secure protocol and a non-secure protocol.

11. The non-transitory machine readable medium of claim 10, wherein the secure protocol comprises a transport layer security (TLS) protocol and the non-secure protocol comprises a plaintext protocol.

12. The non-transitory machine readable medium of claim 10, wherein the machine executable code when executed by the machine further causes the machine to output an alert message when an initiator of the at least one TCP packet has an established relationship requiring communication based on the secure protocol and the determined one of the two or more network protocols comprises the non-secure protocol.

13. A computing device, comprising:
   a memory containing machine readable medium comprising machine executable code having stored thereon instructions for demultiplexing services over ports; and
   a processor coupled to the memory, the processor configured to execute the machine executable code to cause the processor to:
      receive, via a connection over one or more communication networks, at least one transmission control protocol (TCP) packet comprising payload data and a header comprising a port number;
      analyze a portion of the payload data to determine one of two or more network protocols associated with the port number in a stored mapping, wherein the portion of the payload data is separate from the header and differentiates between each of the network protocols;
      select a service associated in the stored mapping with the determined one of the network protocols; and
      bind the selected service to the connection, wherein the selected service is configured to interpret network traffic received via the connection according to the determined one of the network protocols.

14. The computing device of claim 13, wherein the portion of the payload data comprises one or more initial bytes of the payload data.

15. The computing device of claim 14, wherein the two or more network protocols comprise a secure protocol and a non-secure protocol.

16. The computing device of claim 15, wherein the secure protocol comprises a transport layer security (TLS) protocol and the non-secure protocol comprises a plaintext protocol.

17. The computing device of claim 15, wherein the processor is further configured to execute the machine executable code to cause the processor to output an alert message when an initiator of the at least one TCP packet has an established relationship requiring communication based on the secure protocol and the determined one of the two or more network protocols comprises the non-secure protocol.

18. The computing device of claim 13, wherein the two or more network protocols comprise application layers protocols.

19. The computing device of claim 13, wherein the portion of the payload data comprises an initial byte comprising an indication of a content type and the processor is further configured to execute the machine executable code to cause the processor to determine the one of the network protocols based on the content type.

20. The computing device of claim 19, wherein the processor is further configured to execute the machine executable code to cause the processor to determine the one of the network protocols comprises transport layer security (TLS) when the content type indicates a TLS handshake, wherein the connection comprises a transmission control protocol (TCP) connection and TLS is an application layer protocol above TCP for the connection.

* * * * *